J. E. MARWEDEL.
PROCESS FOR THE CONTINUOUS REDUCTION OF AROMATIC NITRO BODIES.
APPLICATION FILED SEPT. 11, 1913.
1,124,776. Patented Jan. 12, 1915.
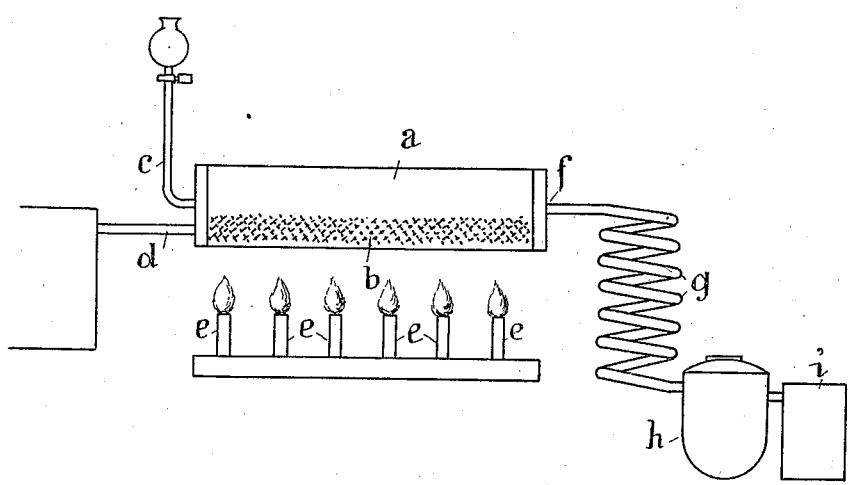

UNITED STATES PATENT OFFICE.

JOHANN EDUARD MARWEDEL, OF UERDINGEN-ON-THE-RHINE, GERMANY.

PROCESS FOR THE CONTINUOUS REDUCTION OF AROMATIC NITRO-BODIES.

1,124,776.      Specification of Letters Patent.      Patented Jan. 12, 1915.

Application filed September 11, 1913. Serial No. 789,319.

*To all whom it may concern:*

Be it known that I, JOHANN EDUARD MARWEDEL, chemist, a subject of the King of Saxony and the German Emperor, residing at 1a Dusseldorferstrasse, Uerdingen-on-the-Rhine, Kingdom of Prussia, German Empire, have invented a new and useful Improvement in Processes for the Continuous Reduction of Aromatic Nitro-Bodies; and I do hereby declare the following to be a full, clear, and exact description of the same.

The present invention relates to an improved process for the continuous reduction of aromatic nitro-bodies, the object being to render the process more effective by the utilization of a more suitable medium to act as a carrier of hydrogen.

According to the specification pertaining to German Patent No. 139457, nitro bodies can be reduced by conducting them, in the gaseous condition, over heated metals such as copper, nickel, cobalt, iron or platinum, in presence of hydrogen or of gases containing hydrogen. This specification expressly states, that, the iron prepared from ferric oxid is only of low efficiency, its activity being lower than that of the other metals.

It has been found that, in contrast to the metallic iron prepared from ferric oxid-ferrous oxid and ferro-ferric oxid are exceedingly well adapted to act as carriers of hydrogen and are therefore admirably suitable for use in the continuous production of reduction compounds of nitro-bodies in a current of reducing gas.

The process according to this invention consists in mixing the nitro-bodies, in the gaseous state, with the reducing gases, and passing them over heated, finely divided ferrous oxid or ferro-ferric oxid. It is advisable to distribute the ferrous oxid or ferro-ferric oxid over inert substances such as asbestos or kieselguhr.

It should be pointed out that in the reduction process described below the iron-oxid compounds remain unchanged, for as is known the reduction of iron-oxid compounds to metallic iron by means of hydrogen does not take place until the temperature exceeds 400° centigrade.

The following example describes the process as used for reducing nitrobenzene to anilin; but other nitro-bodies, such as nitrotoluol or nitroxylol, can also be reduced in the same way.

The accompanying drawing represents a vertical section of an apparatus for carrying out the process.

Example: An iron pipe $a$ is charged with asbestos $b$ (in the form of wool or asbestos fibers). Seventy parts by weight of ferrous oxid, or ferro ferric oxid, are distributed on the surface of the asbestos. The vapors of the nitrobenzene are admitted at $c$. The hydrogen, or gas—for example water gas—containing hydrogen, is introduced through $d$. The nitrobenzene and hydrogen mix together and then pass over the ferrous oxid. The pipe is heated by the flame $e$, the temperature being kept above the boiling point of nitrobenzene and below the temperature at which a reduction of the iron oxid compounds takes place. The relative proportions of the mixture of nitrobenzene and hydrogen are such that about 70 parts, by weight, of hydrogen are employed to 1000 parts, by weight, of nitrobenzene. The gaseous mixture issues from the apparatus at $f$, being then preferably passed through the condensing coil $g$, and is collected in the receiver $h$, which may be connected to a vacuum pump $i$. Care must, of course be taken throughout to keep a sufficient quantity of hydrogen present to prevent the reduction of the nitrobenzene from being arrested at intermediate stages (azobenzol or hydrazobenzol). In order to obtain perfect security, an excess of hydrogen can be used, which excess, on issuing from the pipe, can be mixed with fresh nitrobenzene vapor, passed into a second pipe, and thus completely utilized.

I claim:

1. Process for the continuous reduction of aromatic nitro-bodies, consisting in leading the nitro-bodies, in the gaseous state, along with mixtures of reducing gases, over finely divided oxygen compounds of iron, containing ferrous oxids, while heated to a temperature below that at which ferrous oxid will be reduced.

2. Process for the continuous reduction of nitrobenzol consisting in conducting nitrobenzene, along with mixtures of reducing gases, over finely divided oxygen compounds of iron, containing ferrous oxid, at a temperature above the boiling point of the nitrobenzene and below the temperature at which the reduction of ferrous oxid to metallic iron takes place.

In testimony whereof, I have signed my name to this specification in the presence of two subscribing witnesses.

JOHANN EDUARD MARWEDEL.

Witnesses:
LOUIS VANDORY,
OSCAR DEPNER.